(12) United States Patent
Hsieh et al.

(10) Patent No.: US 6,873,482 B1
(45) Date of Patent: Mar. 29, 2005

(54) MAGNETIC RECORDING DRIVE WITH CONTINUOUS MAGNETIC SERVO SYSTEM

(76) Inventors: Yung-Chieh Hsieh, 3176 Salem Dr., San Jose, CA (US) 95127; Vlad Novotny, 16105 Cerro Vista Dr., Los Gatos, CA (US) 95032

( * ) Notice: Subject to any disclaimer, the term of this patent is extended or adjusted under 35 U.S.C. 154(b) by 0 days.

(21) Appl. No.: 09/518,533

(22) Filed: Mar. 4, 2000

Related U.S. Application Data
(60) Provisional application No. 60/123,089, filed on Mar. 5, 1999.

(51) Int. Cl.$^7$ ................................................. G11B 5/09
(52) U.S. Cl. ........................................ 360/48; 360/77.2
(58) Field of Search ............................... 360/48, 77.05, 360/77.02, 77.08, 46, 65

(56) References Cited

U.S. PATENT DOCUMENTS

| | | | | |
|---|---|---|---|---|
| 3,614,756 A | * | 10/1971 | McIntosh et al. | 360/112 |
| 4,646,168 A | * | 2/1987 | Sonobe et al. | 360/18 |
| 4,864,552 A | * | 9/1989 | Getreuer et al. | 360/77.03 |
| 5,568,331 A | * | 10/1996 | Akagi et al. | 360/135 |
| 5,585,986 A | * | 12/1996 | Parkin | 324/252 |
| 5,792,570 A | * | 8/1998 | Ishikawa et al. | 428/323 |
| 5,982,569 A | * | 11/1999 | Lin et al. | 360/67 |
| 6,212,023 B1 | * | 4/2001 | Bonyhard | 360/15 |
| 6,362,542 B1 | * | 3/2002 | Novotny | 310/12 |
| 6,392,832 B1 | * | 5/2002 | Oshiki et al. | 360/59 |

OTHER PUBLICATIONS

"A Magnetoresistive Readout Transducer," by Robert P. Hunt. IEEE Transactions on Magnets, vol. , Mag–7, No. 1, Mar. 1971. 5 pages.

"Thin Film Magnetoresistors in Memory, Storage, and Related Applications," By David A. Thompson, Lubomyr T. Romankiw, and A. F. Mayadas. IEEE Transactions on Magnetics, vol. , Mag–11, No. 4, Jul. 1975. 11 pages.

"Perpendicular Magnetic Recording –Evolution and Future –," by Shun–ichi Iwasaki. IEEE Transactions on Magnetics, vol. , Mag–20, No. 5, Sep. 1984. 6 pages.

"Extremely High Bit Density Recording with Single–Pole Perpendicular Head," by Setsuo Yamamoto, Yoshihisa Nakamura and Shun–ichi Iwasaki. IEEE Transactions on Magnetics, vol. , Mag–23, No. 5, Sep. 1987. 3 pages.

"Ultra High Density Media: Gigabit and Beyond," Tadashi Yogi and Thao A. Nguyen. IEEE Transactions on Magnetics, vol. 29, No. 1, Jan. 1993. 10 pages.

"A Head–Positioning System Using Buried Servos," by N. H. Hansen. IEEE Transactions on Magnetics, vol. , Mag–17, No. 6, Nov. 1981. 4 pages.

* cited by examiner

*Primary Examiner*—David Hudspeth
*Assistant Examiner*—Varsha A. Kapadia
(74) *Attorney, Agent, or Firm*—Silicon Edge Law Group LLP; Arthur J. Behiel

(57) ABSTRACT

A magnetic recording system containing magnetic recording media with separate data and servo magnetic layers is disclosed. A servo magnetic layer resides usually below the data layer and has higher coercivity than that of the data layer. Interference between the data and servo signals is minimized by recording the servo patterns perpendicular or transverse direction with respect to the orientation of data bits. In addition, servo patterns are selected so that no interference with the data is generated by the servo pattern when the reader is in the middle of data tracks. Tracking error signals are approximately linear with track misregistration around the middle of data tracks. Finally, interference between the data and servo signals is further reduced by electronic processing. Continuous servo signals permit increased track densities with a single actuator and very high track densities with dual microactuator-actuator system.

30 Claims, 7 Drawing Sheets

1.A. Side view

1.B. Top view 2A.1. Side view 2A.2. Top view

→ Magnetization along +X

← Magnetization along -X

O Magnetization along -Z

⊗ Magnetization along +Z

MAGNETIC RECORDING DRIVE WITH CONTINUOUS MAGNETIC SERVO SYSTEM

This application claims the benefit of the U.S. Provisional Application No. 60/123,089, entitled "Magnetic Recording Drive with Continuous Magnetic Servo System", filed on Mar. 5, 1999, which is incorporated herein by reference.

FIELD OF THE INVENTION

The present invention is related to digital magnetic data storage and, in particular, to continuous magnetic servo systems.

BACKGROUND

In a disk-storage system, either magnetic or optical, the servo scheme plays an extremely important role. An efficient servo scheme will increase not only the data density but also the system performance, such as access time. In current magnetic recording technology, the sampled-servo scheme makes it impossible to achieve high track density; this is because the increasing sampling frequency leads to gains the track density but, at the same time, enlarges the overhead. With the present servo schemes, continuous servo does not leave any space for data.

In contrast, in optical disk data storage, a continuous servo signal is obtained from the diffraction of the pre-grooved substrate. The track densities are many times higher than in magnetic hard disk drive (HDD). If the HDD could achieve the same track density as the optical drive, the recording density could be significantly increased.

In this application, we report an invention to provide a continuous servo signal for HDD without increasing the overhead; in fact, the current overhead associated with sampled servo is eliminated.

SUMMARY

In order to increase tracking densities in the magnetic recording drive, continuous servo signals are required. An additional magnetic recording layer is included in the standard magnetic recording disk structure and servo patterns are recorded in this layer. The magnetic coercivity of the servo layer is higher than that of the data layer so that the data recording and erasing cannot overwrite the servo pattern. Gray code and other control signals are usually recorded in the data layer but can be included in the servo layer instead of data layer. The interference between the data and servo signals is minimized by recording the servo patterns in a perpendicular or transverse direction with respect to magnetic orientation of recorded data bits. Preferred servo patterns have the same track width as data tracks, and are shifted by one half of the data track with respect to the data track centers. This way, no interference occurs from the servo signal when the head is tracking perfectly in the middle between adjacent servo tracks. Interference between the data and servo signals is further reduced by dividing the signal detected by a magnetoresistive or giant magnetoresistive sensor into two parts. The low pass filtering is applied to the signal intended to be the servo signal. This signal is also subtracted from the data signal and the resulting signal is high pass filtered to generate the final data signal. Tracking the error signal from the servo channel is used to control the position of the coarse actuator. When ultimate track densities are required, a piezoelectric, electrostatic or electromagnetic microactuator is added to the dual servo control system, which permits improved track positioning with the continuous servo signal.

1B: Top view of the disk with data and sampled servo regions.

Figure 2A:
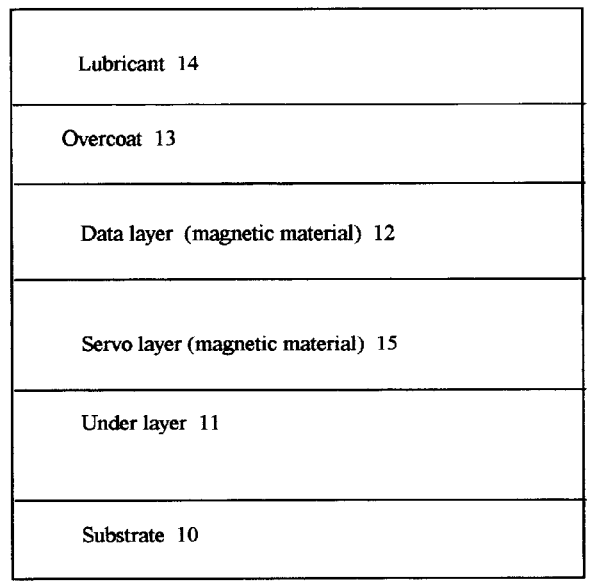
Figure 2A:
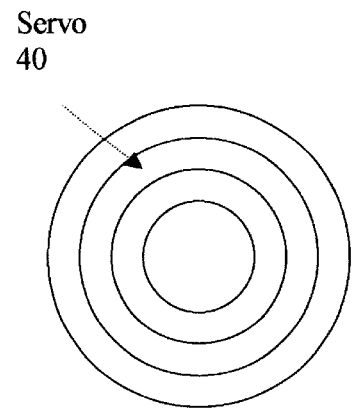

FIG. 2A: The structure of a disk with two magnetic layers, one for data and the other for continuous servo shown in the side view.

2A1: Top view of the disk in FIG. 2A.

2B: The same as A except that isolation layer/underlayer is included between the two magnetic layers.

2C: The same as A except that soft magnetic underlayer is included below (perpendicularly oriented) servo layer.

Figure 3A:
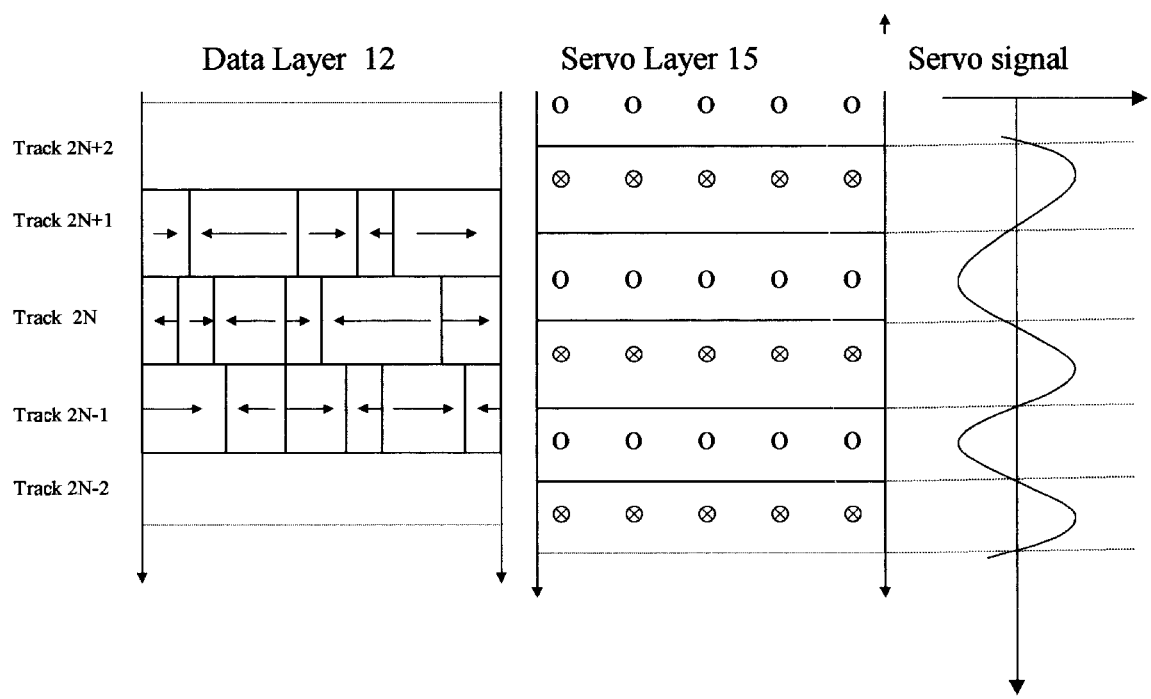

FIG. 3A: The magnetization of the data and servo layers, with data layer magnetized longitudinally and servo layer magnetized perpendicularly. Schematic representation of servo signal from Z-component of magnetization is also included.

3B: The same as A except that the servo layer is magnetized in transverse direction.

Figure 4:
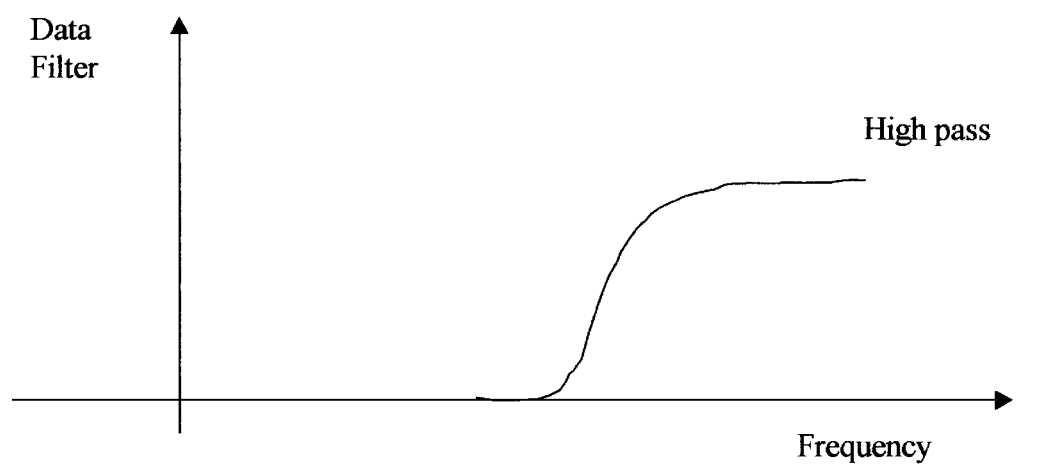
Figure 4:
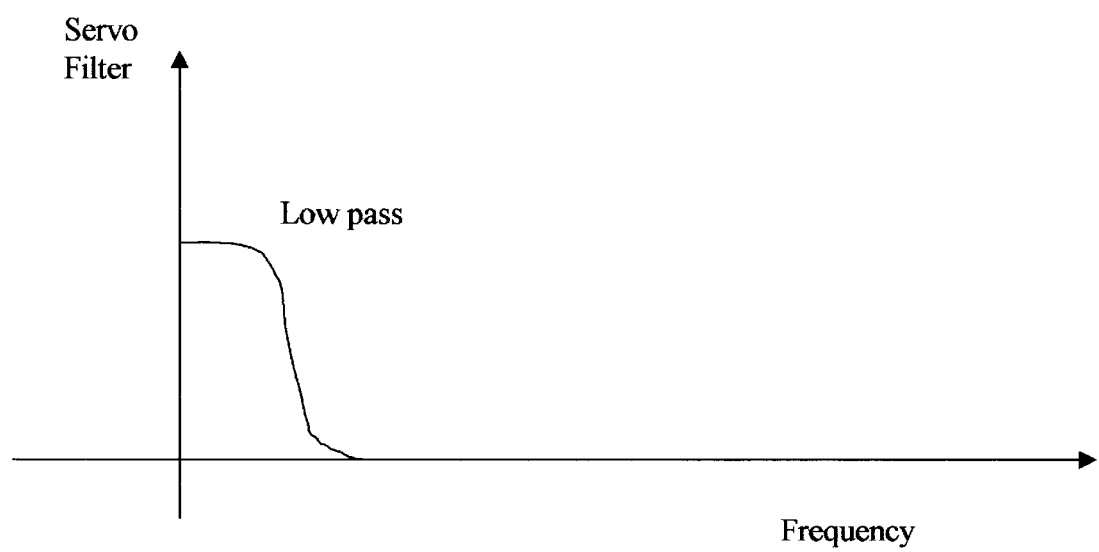

FIG. 4: The frequency response of the data channel and servo channel.

Figure 5:
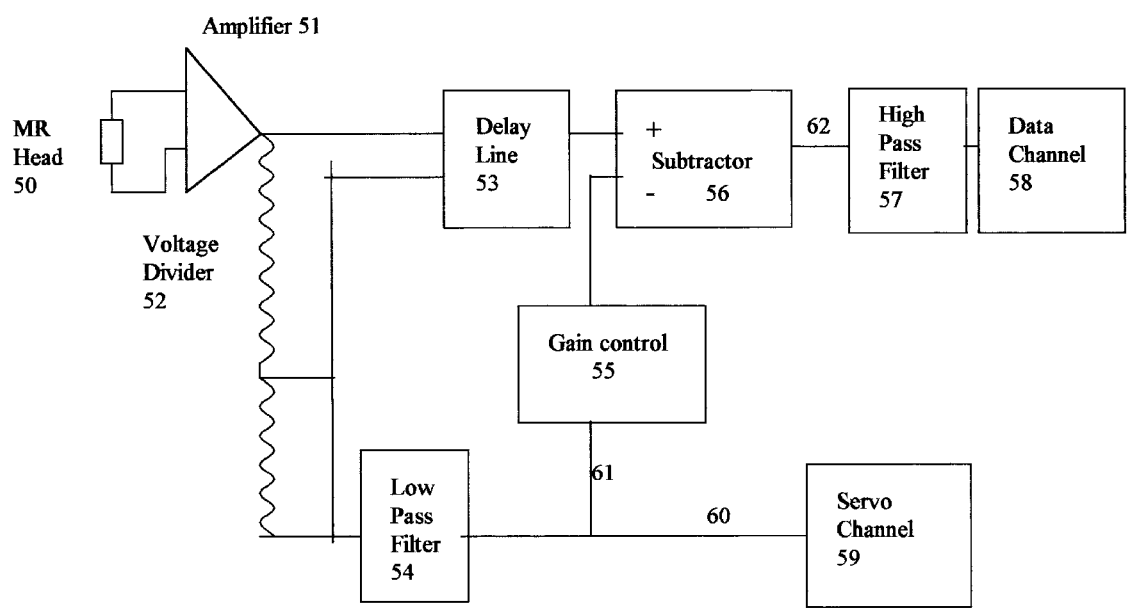

FIG. 5: Schematic diagram of electronic circuitry to further minimize interference between data and servo signals.

Figure 6:
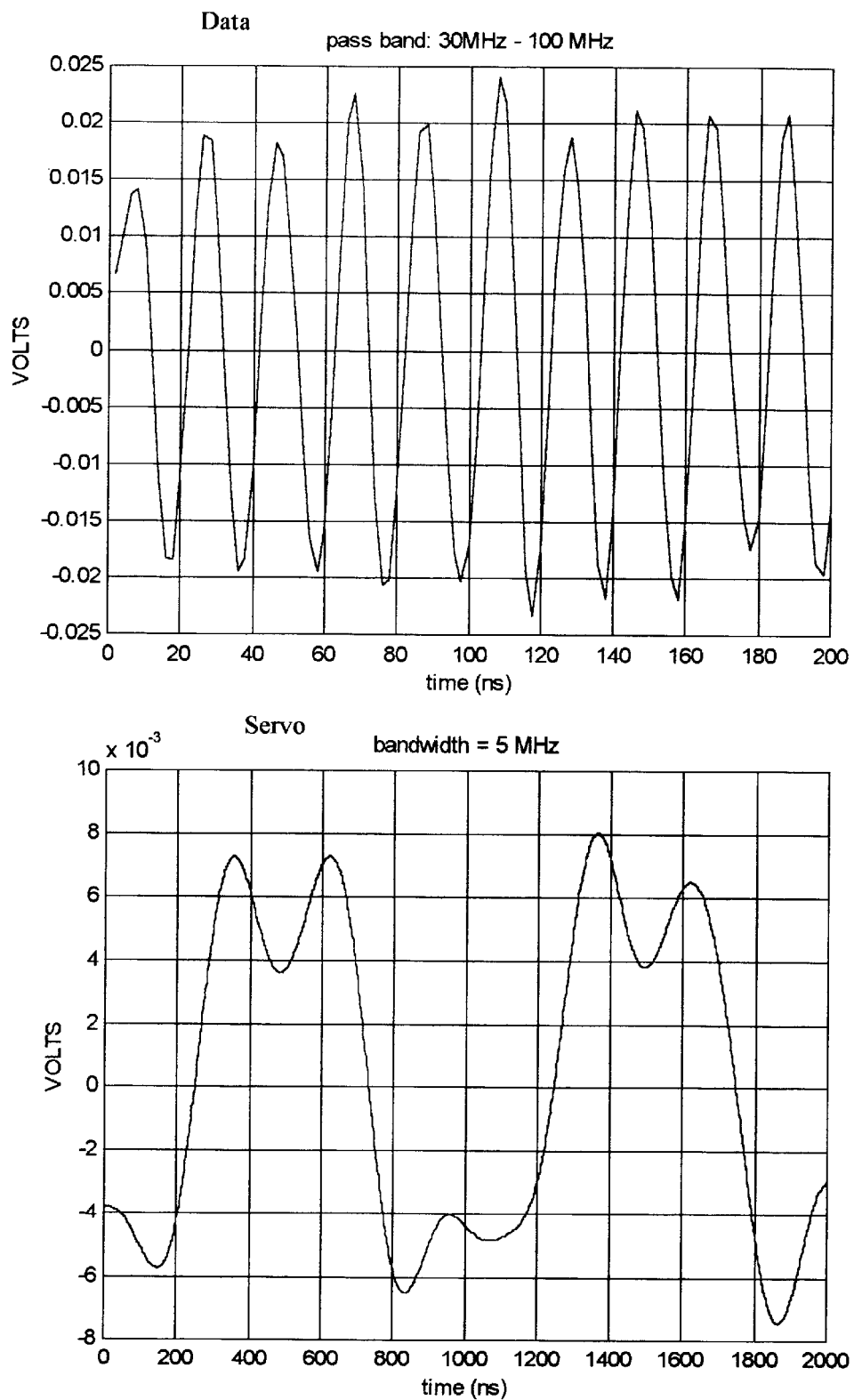

FIG. 6: Example of data and servo signals from the disk with servo and data layers according to this invention.

DETAILED DESCRIPTION OF THE PREFERRED EMBODIMENTS

Figure 1:
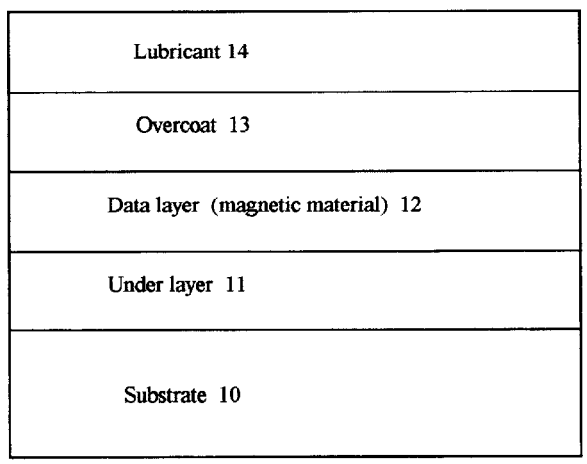
FIG. 1A: The disk structure used for the conventional magnetic hard disk drive shown in the side view.
Figure 1:
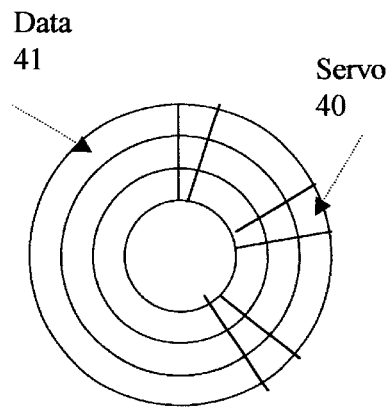

FIGS. 1A and B show the structure of the conventional magnetic disk in the side and top views, respectively. This structure contains a single magnetic layer 12 used to record both the customer data and the servo and gray-code information. The typical layers of the magnetic recording disk are substrate 10, underlayer 11, recording data layer 12, overcoat 13 and lubricant 14. As shown in FIG. 1B, the servo and gray code signals 40 are placed as radial wedges between the data zones 41. High track density requires more servo information; consequently, the space for the customer data is reduced.

Figure 2B:
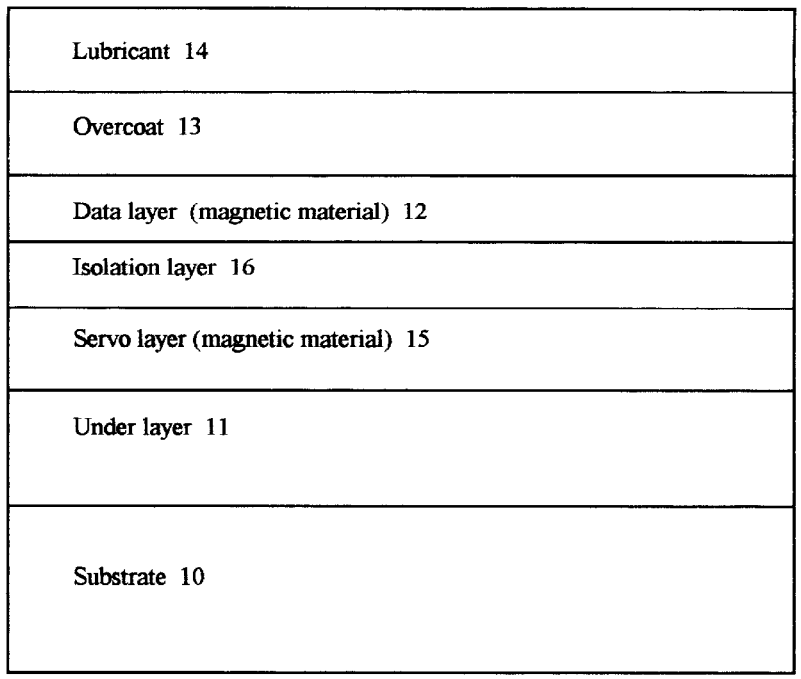
Figure 2C:
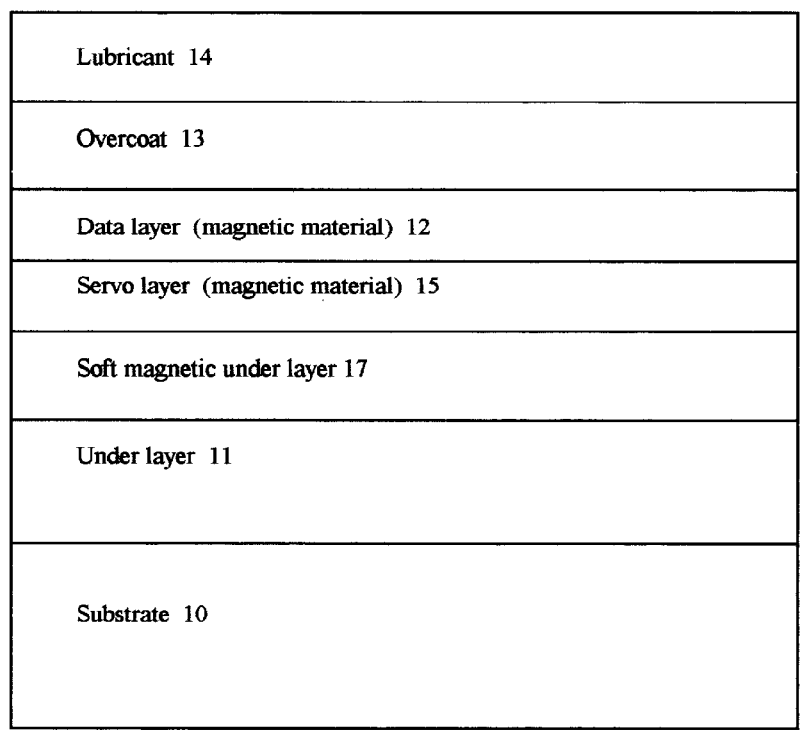

In this invention, we introduce the second magnetic layer 15 to generate the continuous servo signals. FIGS. 2A.1, 2B and 2C show the magnetic disks with two recordable magnetic layers, one for customer data (layer 12) and the other for servo (layer 15). FIG. 2A.2 shows the top view of the servo 40 over the fill recordable disk surface. In FIG. 2B, an extra layer 16 for magnetic isolation is inserted between the servo layer 15 and data layer 12. In FIG. 2C, magnetically soft film 17 is included below the perpendicularly oriented servo layer 15. With the tracking error signal (TES) provided through an independent layer 15, a continuous tracking error signal can be obtained. In this scheme, the track density is determined by the signal-to-noise ratio (SNR) from the servo layer and actuator or/and micro-actuator capabilities. In today's technology, the magnetic bit is elongated in the tracking direction with an aspect ratio (between the track width and bit length) being between 10 and 20, because of sampled TES. With the new scheme, the shape of the recording bit could be close to a square bit, with aspect ratios between 1 and 5, which will reduce the bit area significantly.

The task for the independent servo layer is to minimize, to an acceptable degree, the interference between the signals from two magnetic layers. FIGS. 3A and B show the schematic diagram of the data layer and servo layer. The coordinates are defined in the following manner: +X is the direction of disk motion; +Y is the radial direction across the tracks and +Z is perpendicular to the disk surface.

Figure 3A:
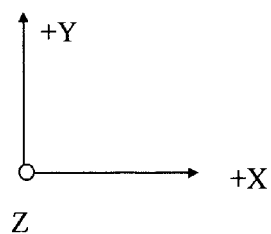

The main idea here is to magnetize the servo layer 15 in a direction perpendicular to the direction of magnetization of the data bits 12. Under such an arrangement, the interference between the data and servo signals can be minimized. The configuration of FIG. 3A is an example, which can be used to explain this point. On the left side of FIG. 3A, three tracks of data are shown; each data mark is magnetized in either the +X or −X direction. In contrast, the servo layer is magnetized in the +Z or −Z direction. The track-pitches of these two layers are the same but are shifted by half track-pitch. The reason why the interference has been minimized is as follows: Assume that the read-back sensor is a magnetoresistive (MR) head. When the head is on the data track center, the signal from the data layer is maximized. At the same time, the head is directly on the transition edge of the servo layers; thus, the total flux of Z-direction from the servo layer is zero because the contribution from the two halves are cancelled by each other. In other words, if the read head is right on the center of the data track, no interference occurs due to the signal from the servo layer. When the reader is displaced from the center of track 2N in the positive +Y cross-track direction (towards track 2N+1), the servo signal will decrease approximately linearly, as indicated in FIG. 3. On the other hand, when the reader moves in the negative −Y cross-track direction (towards track 2N−1) from the center of track 2N, the servo signal will increase, again about linearly.

When the servo signal happens to decrease while the head moves away from the center of an even numbered data track in the positive direction, then the servo signal will increase as the head moves away from the center of odd numbered data track in the same positive direction. In other words, the tracking polarity depends on tracking on the even or odd tracks. For this reason, servo processing must trace whether the track is odd or even numbered so that track misregistration is corrected in the right direction.

Alternate servo patterns embodiments are possible. An example of such a pattern is servo track with width equal to half of the data track width. Two adjacent servo tracks, one magnetized in the positive direction and the second servo track magnetized in the negative directions are aligned with every data track. This pattern has two times higher frequency of servo signal than example in FIG. 3A and it does not require servo channel to keep track of odd and even numbered tracks.

The above explanation is absolutely true when the Y-component of magnetization could be neglected completely. In reality, there is Y-component of magnetization in the transition edge of the servo layer. Therefore, the optimized track offset between the data and servo layer may not be a half-track. Instead, it should depend on the detail parameter in the system.

Figure 3B:
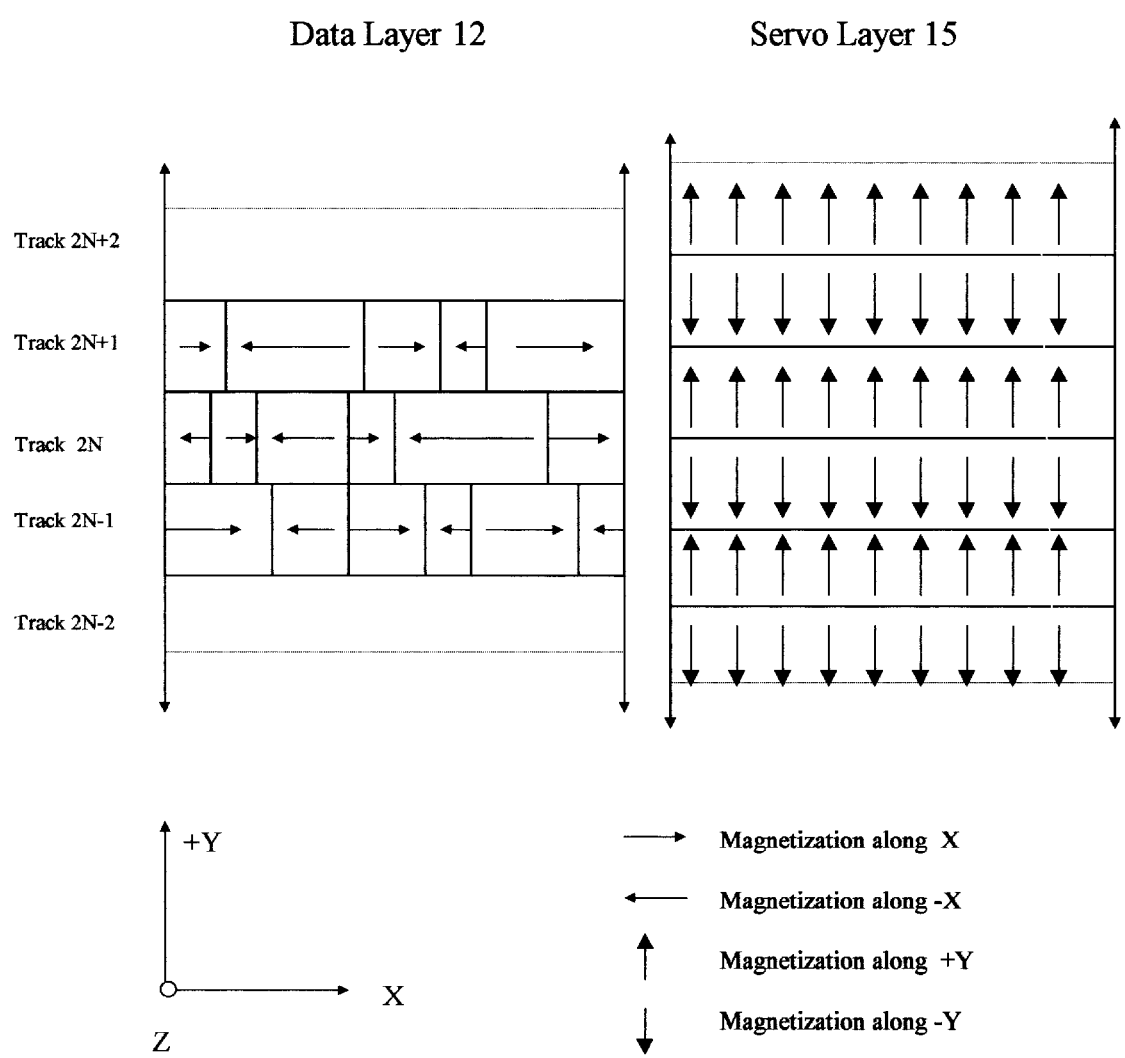

Another servo alternative is shown in FIG. 3B where servo magnetization is again perpendicular to the magnetization of data bits, however servo magnetization is in the transverse direction. Again, the track offset between the data layer and servo layer should be determined by the other parameter in the system, such as film thickness and magnetization of those layers.

Additional example of servo pattern is a conventional ABCD checkerboard that is extensively used in sampled servo systems. In present implementation, checkerboard pattern is continuous around disk circumference in the servo layer as opposed to discontinuous pattern in the data layer in the conventional servo system.

Examples of longitudinal magnetic recording films are CoCrPt, CoCrTa alloys and examples of perpendicularly oriented films are CoCr, TbFeCo, TbGdCo alloys, multilayers of CoPt, CoPd and other magnetic films. Magnetic coercivity of servo film should be higher than magnetic coercivity of data film.

Servo and data signals are superimposed, and they have to be separated. Fortunately, the frequency bandwidth of the servo signal is much lower than that of the data. The data and servo signals can be easily filtered after they are divided into two separate channels. FIG. 4 shows the frequency response of the high pass data-filter and low pass servo-filter. For the configuration of FIG. 3B, when the head is on the center of the data track, there is a DC bias contribution from the servo layer. However, it is possible to remove it by proper signal processing.

Interference between the magnetic data and servo signal can be further minimized with the approach presented in FIG. 5. First, the signal detected by the reader 50 is amplified with amplifier 51 and divided into two separate signals with divider 52. The first signal, called servo signal is passed through the low pass filter 54. The second signal, referred to here as data signal is time delayed with unit 53 by a proper duration. The servo signal 60 is sent directly into servo channel 59 and also into gain controller 55. The signal 61 is subtracted with 56 from the time delayed data signal. Finally, the resulting data signal 62 is filtered with a high pass filter 57 and decoded with standard digital decoding techniques in the data channel 58.

The servo signal, obtained after the low pass filtering, is processed to generate a tracking error signal that is fed into the coarse actuator (usually of rotary type). In order to take full advantage of the continuous tracking error signal, a microactuator is added to the coarse actuator, which improves the tracking capability and leads to much higher tracking densities. Microactuators can be piezoelectric, electromagnetic or electrostatic, and they can be placed on an actuator arm, a slider, or suspensions according to established prior art.

Writing the servo pattern on the magnetic layer with very high coercivity requires the heads with high saturation magnetization pole tips. Alternatively, heads with normal saturation magnetization can be used. However, in this case, the servo writing can be performed at elevated temperatures in order to lower the magnetic coercivity of the servo layer temporarily during servo writing. Global or local heating of the disk can be used. Local heating can be accomplished with focussed light beam at the location of inductive writer. Focussed laser diode beam is one example of one convenient implementation of localized heating.

Gray code and other control signals are generally recorded into the data layer but can be also recorded into the servo layer. In the second case, the servo signals would be interrupted for a short period of time and the data would not be recorded onto the data layer during these gray code bursts. Gray codes and other control signals are processed, as is data, with high bandwidth electronics.

Example of data and continuous servo signal according to this invention is included in FIG. 6. 1 MHz servo signal is recorded for this demonstration and data has frequency of 50 MHz Servo and data signals are filtered with low and high pass filters respectively.

The present invention has been particularly shown and described with respect to certain specific embodiments and features. However, it is readily apparent to those with ordinary skills in the art that various changes and modifications in form of detail may be made without departing from the spirit and scope of the inventions set forth in the claims. Particularly apparent is that a wide variety of materials may be used in the magnetic recording disks and heads. Also, it is noted that a wide variety of servo patterns and methods of their recording can be used. Finally, the invention disclosed may be practiced without any element not specifically described herein.

What is claimed is:

1. A magnetic recording disk comprising:
   a. a substrate having a substrate surface plane defining an X axis and a Y axis; and
   b. recordable layers disposed on the substrate in parallel with the X and Y axes, the recordable layers including:
      i. a magnetic data layer storing customer data as recorded data bits magnetized in a first direction of magnetization; and
      ii. a magnetic servo layer storing servo information as recorded servo bits magnetized in a second direction of magnetization perpendicular to the first direction of magnetization;
   c. wherein one of the first and second directions of magnetization is normal to the substrate surface plane.

2. The magnetic recording disk of claim 1, wherein the magnetic servo layer is disposed between the data layer and the substrate.

3. The magnetic recording disk of claim 1, further comprising an isolation layer disposed between the magnetic data layer and the magnetic servo layer.

4. The magnetic recording disk of claim 3, wherein the isolation layer provides magnetic isolation.

5. The magnetic recording disk of claim 1, wherein recorded servo bits generate a continuous servo signal.

6. The magnetic recording disk of claim 1, further comprising a soft-magnetic layer disposed between the magnetic servo layer and the substrate surface.

7. The magnetic recording disk of claim 1, wherein the data layer includes a plurality of parallel data tracks, each data track having a data-track width in a direction normal to disk motion.

8. The magnetic recording disk of claim 1, wherein the servo layer includes a plurality of parallel servo tracks, each servo track having a servo-track width in the direction normal to disk motion.

9. The magnetic recording disk of claim 8, wherein the data tracks are offset from the servo tracks in the direction normal to disk motion.

10. The magnetic recording disk of claim 9, wherein the data tracks are offset from the servo tracks by about half the data-track width.

11. The magnetic recording disk of claim 1, wherein the servo layer has a first magnetic coercivity and the data layer has a second magnetic coercivity lower than the first magnetic coercivity.

12. The magnetic recording disk of claim 1, wherein the servo layer comprises at least one of CoCr, TbFeCo, TbGdCo, CoPt, and CoPd.

13. The magnetic recording disk of claim 12, wherein the servo bits are recorded at a first temperature and the data bits are recorded at a second temperature substantially lower than the first temperature.

14. A magnetic recording drive comprising:
   a. a magnetic recording disk having:
      i. a substrate having a substrate surface extending in a surface plane;
      ii. recordable disk layers disposed on the substrate surface and in parallel with the substrate surface, the recordable disk layers including:
         (1) a magnetic data layer storing customer data and magnetized in a first direction of magnetization; and
         (2) a magnetic servo layer storing servo information and magnetized in a second direction of magnetization perpendicular to the first direction of magnetization; and
   b. a read-back sensor proximate to the recordable disk surface and receiving the customer data and the servo data, the read-back sensor producing a data signal from the servo data and a servo signal from the servo information;
   c. wherein one of the first and second directions of magnetization is normal to the surface plane.

15. The magnetic recording drive of claim 14, wherein the recordable disk layers rotate in a direction of disk motion, and wherein one of the first and second directions parallels the direction of disk motion.

16. The magnetic recording drive of claim 15, further comprising
an electronic circuit connected to the read-back sensor and receiving the data signal and the servo signal, the electronic circuit including a high-pass filter selecting the data signal and a low-pass filter selecting the servo signal.

17. The magnetic recording drive of claim 14, wherein the read-back sensor includes at least one magnetoresistive head.

18. The magnetic recording drive of claim 14, wherein the magnetic servo layer is disposed between the data layer and the substrate.

19. The magnetic recording drive of claim 14, further comprising an isolation layer disposed between the magnetic data layer and the magnetic servo layer.

20. The magnetic recording drive of claim 19, wherein the isolation layer provides magnetic isolation.

21. The magnetic recording drive of claim 14, further comprising a soft-magnetic layer disposed between the magnetic servo layer and the substrate.

22. The magnetic recording drive of claim 14, wherein the recordable disk layers rotate in a direction of disk motion, and wherein the data layer includes a plurality of parallel data tracks, each data track having a data-track width in a direction normal to the direction of disk-motion.

23. The magnetic recording drive of claim 22, wherein the servo layer includes a plurality of parallel servo tracks, each servo track having a servo-track width in the direction normal to the direction of disk motion.

24. The magnetic recording drive of claim 23, wherein the data tracks are offset from the servo tracks in the direction normal to the direction of disk motion.

25. The magnetic recording drive of claim 24, wherein the data tracks are offset from the servo tracks by about half the data-track width.

26. The magnetic recording drive of claim 14, wherein the servo layer has a first magnetic coercivity and the data layer has a second magnetic coercivity lower than the first magnetic coercivity.

27. The magnetic recording drive of claim 26, wherein the servo layer comprises at least one of CoCr, TbFeCo, TbGdCo, CoPt, or CoPd.

28. The magnetic recording drive of claims 14, further comprising a microactuator holding the read-back sensor proximate to the recordable disk surface.

29. A magnetic recording drive comprising:
a. a magnetic recording disk having:
   i. a substrate having a substrate surface extending in a surface plane;
   ii. recordable disk layers disposed on the substrate surface and in parallel with the substrate surface, the recordable disk surface including:
      (1) a magnetic data layer;
      (2) a magnetic servo layer; and
b. means for magnetizing the magnetic data layer in a first direction to store customer data;
c. means for magnetizing the magnetic servo layer in a second direction perpendicular to the first direction to store servo information; and
d. a read-back sensor proximate to the recordable disk surface and receiving the customer data and the servo data, the read-back sensor producing a data signal from the servo data and a servo signal from the servo information;
e. wherein one of the first and second directions is normal to the recordable disk surface.

30. The magnetic recording drive of claim 29, wherein the recordable disk surface rotates in a direction of disk motion, and wherein one of the first and second directions parallels the direction of disk motion.

* * * * *